United States Patent
Stone

(10) Patent No.: US 7,230,228 B2
(45) Date of Patent: Jun. 12, 2007

(54) TUNABLE TEMPORAL DISPERSION AND COMPENSATED ANGULAR DISPERSION IN OPTICAL SWITCHING SYSTEMS

(75) Inventor: Thomas W. Stone, Hellertown, PA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 10/717,414

(22) Filed: Nov. 18, 2003

(65) Prior Publication Data

US 2005/0103985 A1    May 19, 2005

(51) Int. Cl.
*H01J 5/16*    (2006.01)
*G02B 6/26*    (2006.01)

(52) U.S. Cl. .................. 250/216; 250/227.23; 385/16; 398/45

(58) Field of Classification Search ........... 250/227.18, 250/227.23, 216, 227.11, 227.12; 359/238; 356/303, 305, 462; 385/16, 37; 398/45, 398/47, 49, 52, 84, 98
See application file for complete search history.

(56) References Cited

U.S. PATENT DOCUMENTS

| | | | | |
|---|---|---|---|---|
| 4,655,547 A | * | 4/1987 | Heritage et al. | 359/563 |
| 4,786,124 A | | 11/1988 | Stone et al. | |
| 5,692,077 A | * | 11/1997 | Stone et al. | 385/16 |
| 5,771,320 A | | 6/1998 | Stone | |
| 5,982,515 A | * | 11/1999 | Stone et al. | 385/18 |

* cited by examiner

*Primary Examiner*—Kevin Pyo

(57) ABSTRACT

Methods for utilizing optical systems in order to introduce digitally tunable amounts of temporal dispersion into optical signals and methods and systems for providing angular dispersion compensated output from optical switching/routing systems.

6 Claims, 9 Drawing Sheets

TUNABLE TEMPORAL DISPERSION AND COMPENSATED ANGULAR DISPERSION IN OPTICAL SWITCHING SYSTEMS

STATEMENT REGARDING FEDERALLY SPONSORED RESEARCH OR DEVELOPMENT

This invention was made partially with U.S. Government support from the U.S. Air Force under Contract F30602-98-C-0079. The U.S. Government has certain rights in the invention.

BACKGROUND OF THE INVENTION

This invention relates generally to optical communications systems, and more particularly to optical switch technology.

With the advent of substantial new uses for electro/optic systems, there exists a greater need to effectively control the multiplexing, demultiplexing and routing of signals that are Wavelength Division Multiplexed (WDM), and Dense Wavelength Division Multiplexed (DWDM), on optical fibers. Among the operations required in managing such WDM and DWDM systems are addition of signals into empty channels (Add) and selection of signals from populated channels (Drop), split, or route signals of different channels (interleaving and channelizing), and cross connecting from m channels to n channels (m×n cross-connect).

U.S. Pat. No. 5,771,320 discloses a free space optical switching and routing system utilizing a switchable grating based approach together with novel noise suppression techniques. This family of devices provides for an optical switching and routing system that is useful for interconnecting any of an input array's optical channels to any of an output array's optical channels.

In most typical optical communications systems, the optical channels are carried through the system mostly by means of optical fibers. The optical fibers provide, in most applications, the input channels for the optical switching and routing system and also, receive the output channels of the optical switching and routing system. There is a need for decreased fiber coupling losses.

In optical fiber communications systems, it is sometimes desirable to introduce controllable amounts of temporal dispersion. There is a need for methods of introducing tunable amounts of temporal dispersion into optical signals.

There is also a need for reduced crosstalk between channels in optical switching and routing Systems.

It is therefore an object of this invention to provide methods for utilizing optical systems in order to introduce digitally tunable amounts of temporal dispersion into optical signals.

It is a further object of this invention to provide methods and systems for providing angular dispersion compensated output which lead to decreased fiber-coupling losses.

BRIEF SUMMARY OF THE INVENTION

The objects set forth above as well as further and other objects and advantages of the present invention are achieved by the embodiments of the invention described hereinbelow.

The present invention provides methods for utilizing optical systems in order to introduce digitally tunable amounts of temporal dispersion into optical signals and methods and systems for providing angular dispersion compensated output from optical switching/routing systems. The method of this invention for introducing controlled amounts of temporal dispersion into a signal includes the steps of (a) selectively directing an electromagnetic radiation beam to a predetermined optical path, and (b) subsequently selectively directing the electromagnetic radiation beam to another predetermined optical path. The method can also include the step of redirecting the subsequently selectively directed electromagnetic radiation beam to a predetermined direction. Redirecting the subsequently selectively directed electromagnetic radiation beam to a predetermined direction can result in a longer propagation distance and a larger amount of temporal dispersion.

The angular dispersion compensated optical system or sub-system of this invention includes a switching/routing optical sub-system and a beam deflection element optically disposed on the multiple beam output side of the switching/routing optical sub-system. During operation of the angular dispersion compensated optical system or sub-system, the beam deflection element selectively deflects output electromagnetic radiation beams originating from the switching/routing optical sub-system in order to render, after selective deflection, a direction of propagation of the electromagnetic radiation output beams parallel to the direction of propagation of an input beam of the switching/routing optical system.

Utilization of a pixellated switched grating as the beam deflection element enables decreasing the detected crosstalk from all the non-selected beam paths.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWING

FIG. 1b is a graphical schematic representation of a section of the prior art grating based switching/routing optical system of FIG. 1a;

DETAILED DESCRIPTION OF THE INVENTION

Figure 1A:
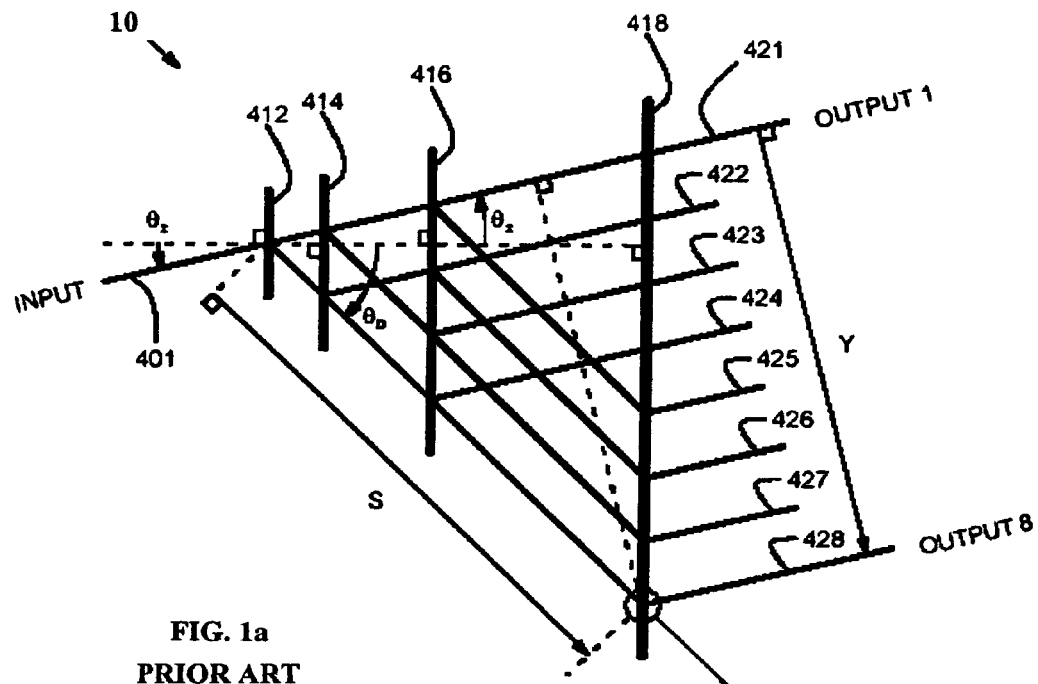
FIG. 1a is a graphical schematic representation of a prior art grating based switching/routing optical system.

In order to better understand the present invention described below, it should be noted that certain terms used in the description of the invention have interchangeable usage. For example, the term "optical" refers not only to optical components, but also to electro-optical components and the terms "optical beam" and "electromagnetic radiation beam" may be used interchangeably.

Furthermore, terms such as "beam paths" and "channels" may also be interchanged, in certain instances, based upon their usage as recognized in the art.

In addition, identical components may be referred to with identical reference numerals within the specification and drawings for simplifying an understanding of the various components of this invention.

Methods for utilizing optical systems in order to introduce digitally tunable amounts of temporal dispersion into optical signals and methods and systems for providing angular dispersion compensated output are disclosed herein below.

Figure 1B:
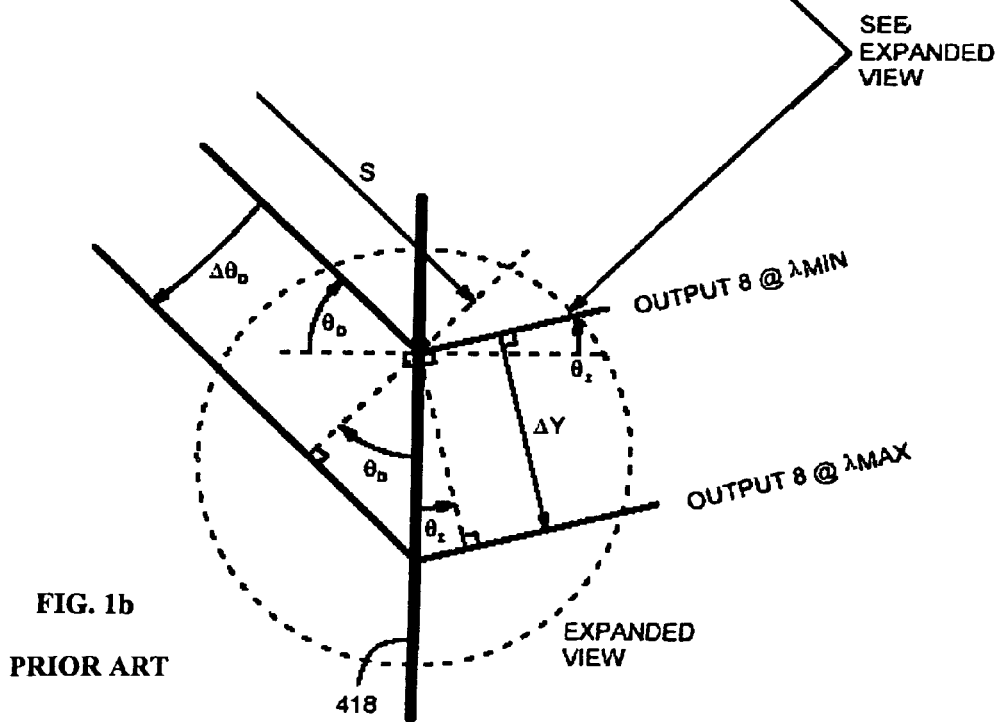

FIGS. 1a and 1b illustrate a prior art grating based switching/routing system 10 including four switchable gratings 412, 414, 416, 418. The operation of the switching/routing system 10 is described in U.S. Pat. No. 5,982,515, hereby incorporated by reference. Due to the diffractive nature of the grating based switching/routing system, it suffers from a lateral chromatic shift that varies with each output channel. FIG. 1b depicts the diffraction of an optical beam 428 by a switchable grating 418 and illustrates the lateral chromatic shift. The origin of the temporal dispersion increments is due to the variation in optical path length with wavelength, which can result from propagation in an angularly dispersed state and can also result from propagation with the lateral chromatic shift shown in FIG. 1b. For each switched path, there are differing amounts of distance propagated while the spectral components of the input are angularly separated. As a result, the longer wavelength spectral components of a given input beam are delayed with respect to the shorter wavelength components of that input.

Figure 2:
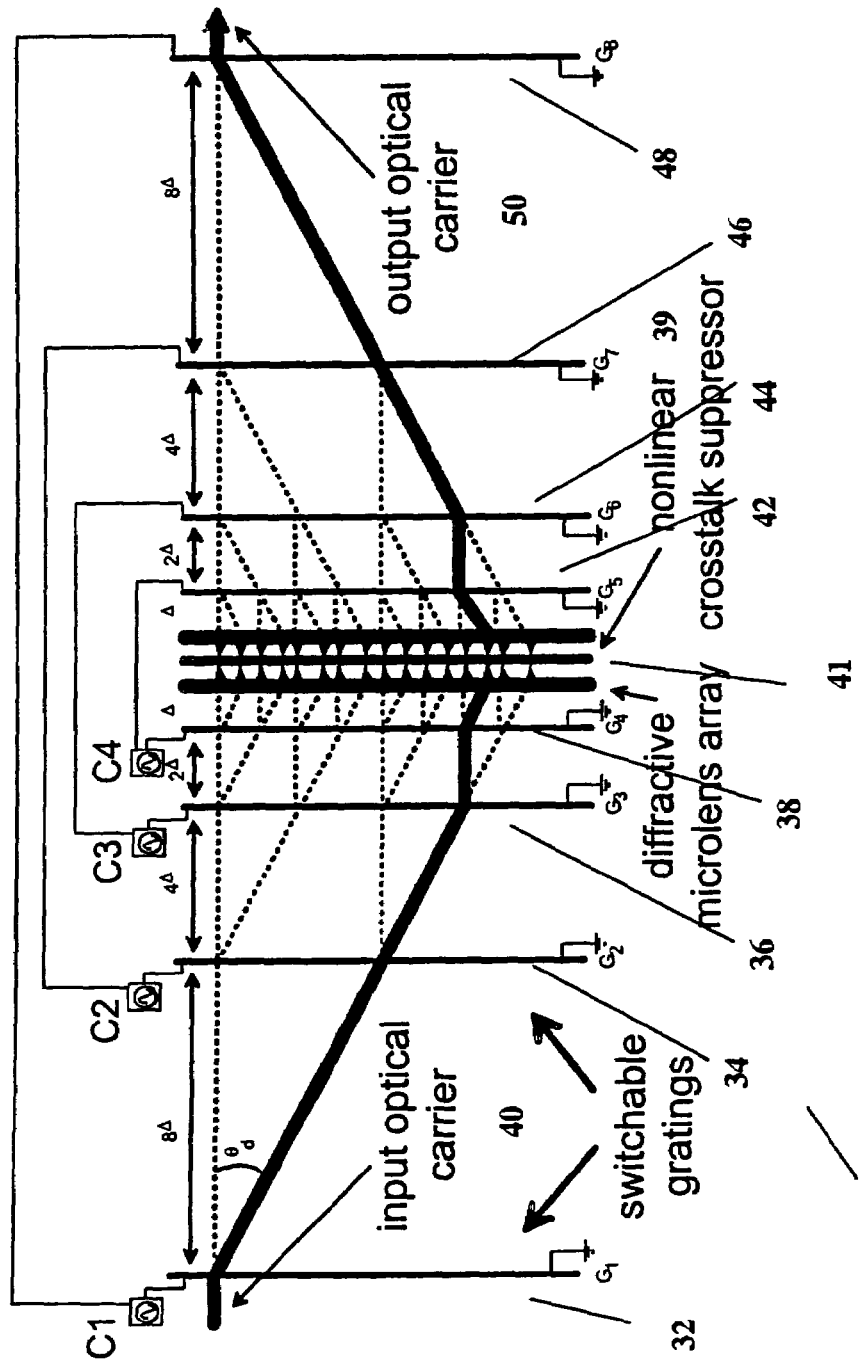
FIG. 2 is a graphical schematic representation of another prior art grating based switching/routing optical system.

In one embodiment, shown in FIG. 2, a cascade 30 of 2n switched gratings 32, 34, 36, 38, 42, 44, 46, 48 are used to introduce one of $2^n$ equal increments of temporal dispersion on an input optical signal 40. These increments of temporal dispersion are also accompanied by time shifts. Prior art transmission-grating-based optical time delay systems, such as the system described in U.S. Pat. No. 5,982,515, can be used to provide tunable temporal dispersion.

Referring again to FIG. 2, when all the switched gratings 32, 34, 36, 38, 42, 44, 46, 48 are transparent, an input optical signal ("electromagnetic radiation beam") 40 is transmitted with a baseline amount of temporal dispersion due to propagation through the system 30. (The baseline amount is substantially smaller than the grating induced temporal dispersion.) As the gratings 32, 34, 36, 38, 42, 44, 46, 48 are switched providing for varying displacements down a central plane 41, increasing quantities of dispersive delay between the short and long wavelength components of the optical signal 40 are introduced. Switching each of the gratings 32, 34, 36, 38, 42, 44, 46, 48 directs the input optical signal 40 to a predetermined optical path. When the beam propagates in the diffracted direction other than the incident direction of the input optical signal 40, increments of temporal dispersion are introduced into the optical signal. When the optical beam 40 propagates substantially parallel to the direction of the input beam due to experiencing equal amounts of clockwise and counterclockwise deviation (or when the optical beam 40 experiences substantially equal amounts of clockwise and counterclockwise deviation), there is no angular dispersion and, therefore, no grating induced temporal dispersion accumulates. (Hereinafter, rendering the direction of propagation of the optical beam substantially parallel to the direction of the input beam refers to rendering the direction of propagation of the optical beam substantially parallel to the direction of the input beam due to experiencing equal amounts of clockwise and counterclockwise deviation.)

In the embodiment shown in FIG. 2, the subsequent gratings are switched until a direction of propagation of the output electromagnetic radiation beam 50 is the same as a direction of propagation of the input signal 40.

Figure 3A:
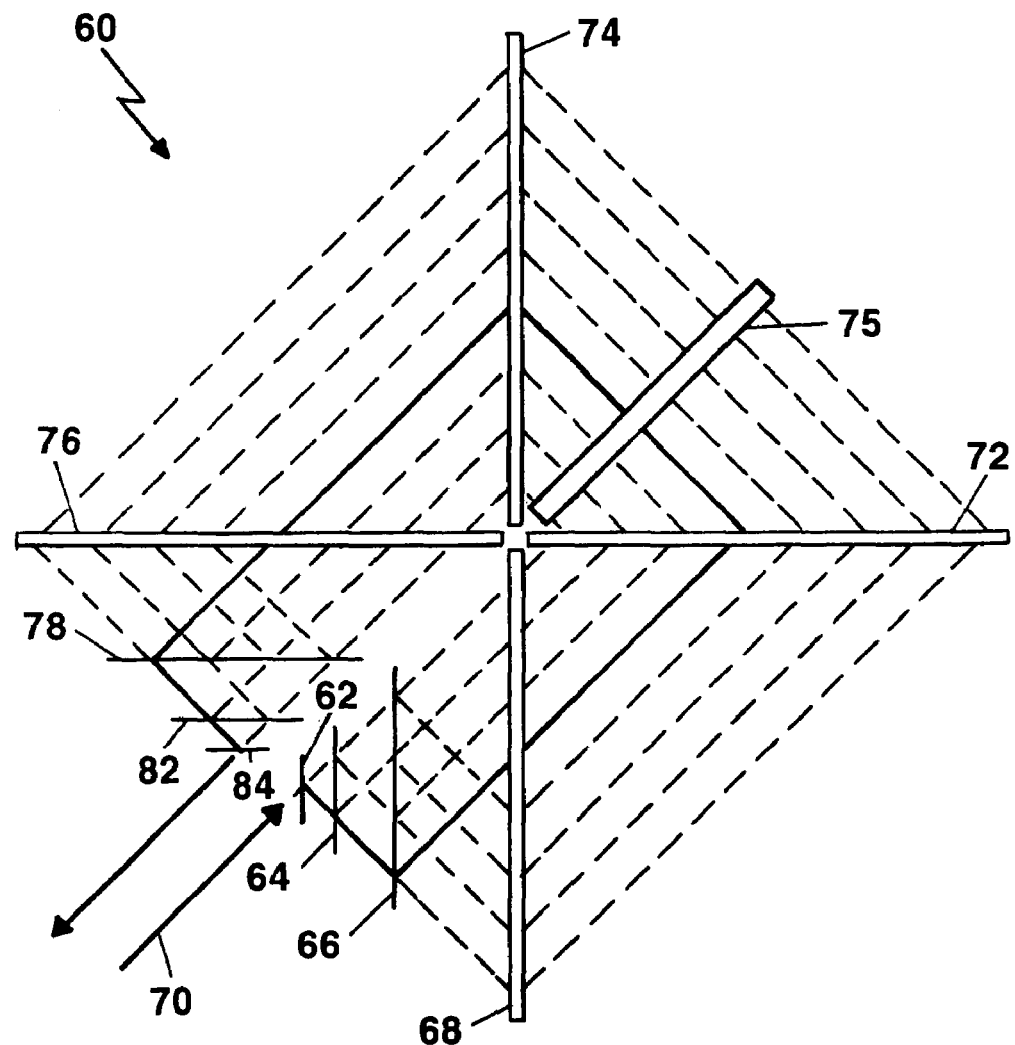
FIGS. 3a and 3b are graphical schematic representation of embodiments of a grating based switching/routing optical system utilized for introducing controlled amounts of temporal dispersion.
Figure 3B:
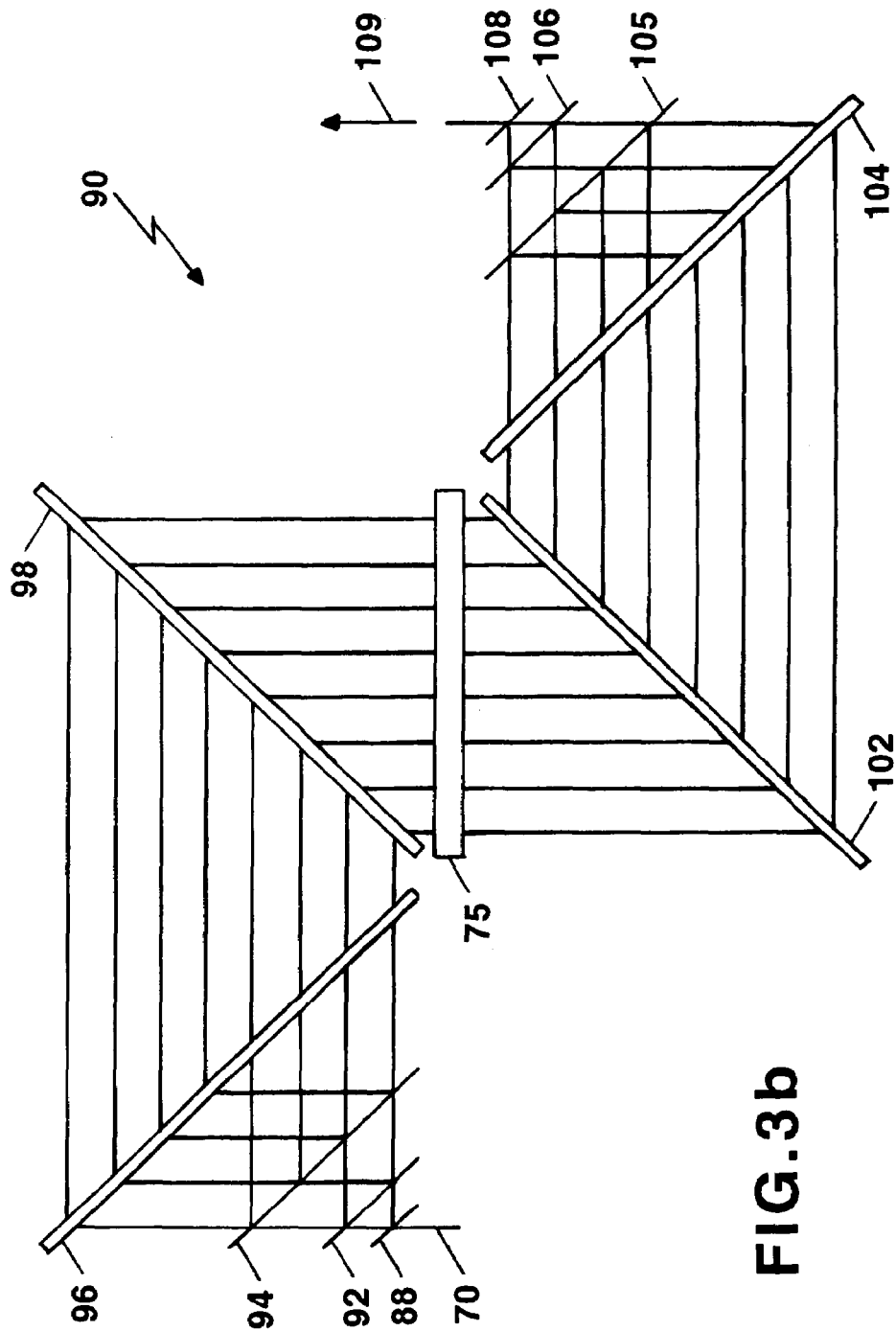

Larger amounts of temporal dispersion may be introduced in other embodiments, such as that shown in FIGS. 3a and 3b, where the diffraction angles are increased. Referring to FIG. 3a, the system 60 includes gratings 62, 64, 66, 78, 82, 84 that are capable of directing an input optical signal 70 to a path at a larger diffraction angle than that shown in FIG. 1. Also referring to FIG. 3a, the system 60 includes redirecting elements 68, 72, 74, 76 (gratings or mirror arrays). The redirecting elements 68, 72, 74, 76 direct the optical signal 70 ("electromagnetic radiation beam") to a predetermined direction and allow a longer propagation distance and a larger amount of temporal dispersion. In the embodiment shown in FIG. 3a, the redirecting elements 68, 72, 74, 76 and the switching of subsequent gratings 78, 82, 84 result in a direction of propagation of the output beam 80 that is parallel but opposite (anti-parallel) to a direction of propagation of the input signal 70.

Referring to FIG. 3b, the system 90 includes gratings 88, 92, 94, 105, 106, 108 that are capable of directing an input optical signal 70 to a path at a larger diffraction angle than that shown in FIG. 1. Also referring to FIG. 3b, the system 90 includes redirecting elements 96, 98, 102, 104 (gratings or mirror arrays). Redirecting elements 96 and 104 can be, in one embodiment, pixellated or switchable redirecting gratings. Redirecting elements 98 and 102 can be, in one embodiment, fixed gratings or mirrors. The redirecting elements 96, 98, 102, 104 direct the optical signal 70 ("electromagnetic radiation beam") to a predetermined direction and allow a longer propagation distance and a larger amount of temporal dispersion than in the configuration of FIG. 2. In the embodiment shown in FIG. 3b, the redirecting elements 96, 98, 102, 104 and the switching of subsequent gratings 105, 106, 108 result in a direction of propagation of the output beam 109 that is parallel to a direction of propagation of the input signal 70.

Both the embodiments of FIGS. 2, 3a and 3b include a cross talk suppressing element 39 and 75, such as that described in U.S. Pat. No. 5,982,515. In the embodiments of FIG. 2, the cross talk suppressing element 39 is located at central plane 41. In the embodiments of FIG. 3a, the cross talk suppressing element 75 between the switchable grating cascades as shown. In this location all the possible optical paths may be spatially separated and, therefore, deviating elements (such as, but not limited to, spatial light modulators (SLMs) and pixilated switchable gratings) can be used to selectively increase loss in the non-selected channels, thereby reducing crosstalk.

In the embodiment shown in FIG. 2 the direction of propagation of the output beam 50 can be rendered parallel to the direction of propagation of the input signal 40. In an uncompensated system, such as the embodiment of the switching/routing sub-system 120 shown in FIG. 4, half of the selectable beam paths (channels) 112, 116 exit the last switched grating parallel to the input beam 110 (heading upward) and half the selectable beam paths (channels) 114, 118 exit the last switched grating parallel to the other diffracted order 115 (heading downward). For efficient coupling of the output to optical fibers, it is advantageous to choose the common output direction parallel to the input (or equivalently, ensure that each path has an equal number of clockwise and counterclockwise diffractions of equal angle) so that the angular dispersion will be substantially eliminated.

Figure 4:
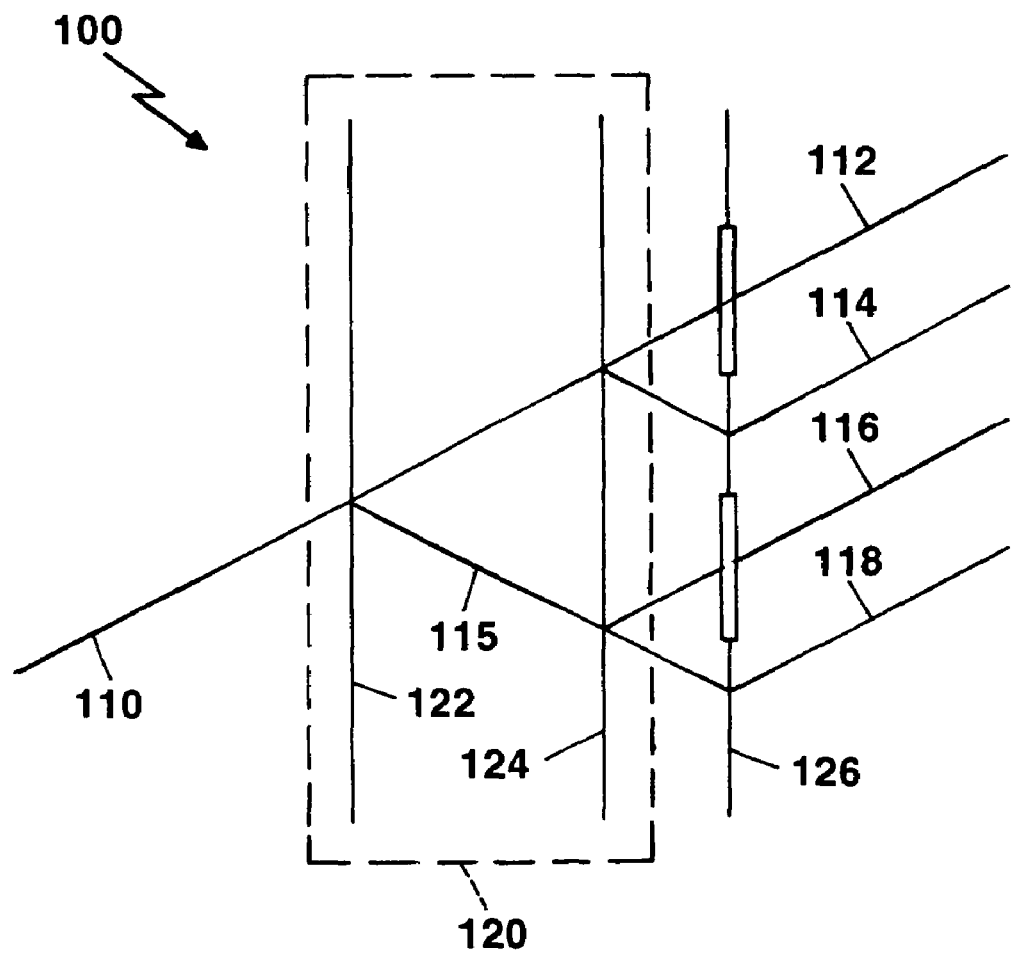
FIG. 4 is a graphical schematic representation of an embodiment of an angular dispersion compensated grating based switching/routing optical system.

In the embodiment of an angular dispersion compensated optical switching/routing system 100 shown in FIG. 4, a beam deflection element 126 (a pixellated non-switchable steering grating in the embodiment of FIG. 4) is used to provide the compensating counterclockwise diffraction to the channels 114, 118 that have an unbalanced clockwise diffraction. One channel 112 experiences no diffractions and is thus not angularly dispersed. Another channel 116 experiences symmetric clockwise and counterclockwise diffraction in the switching/routing sub-system 120, is not angularly dispersed and, therefore, does not require diffraction by the steering grating 126. The pixellated non-switchable steering grating 126 is patterned to selectively deflect the channels 114, 118 that have experienced an unbalanced clockwise diffraction from the optical switching and routing sub-system 120. The pixellated non-switchable steering grating 126 imparts a compensating clockwise diffraction on channels 114 and 118. Non-Diffracting (transparent, also referred to as clear) pixels in the pixellated steering grating 126 are used to transmit beams 112 and 116 without diffraction.

Figure 5:
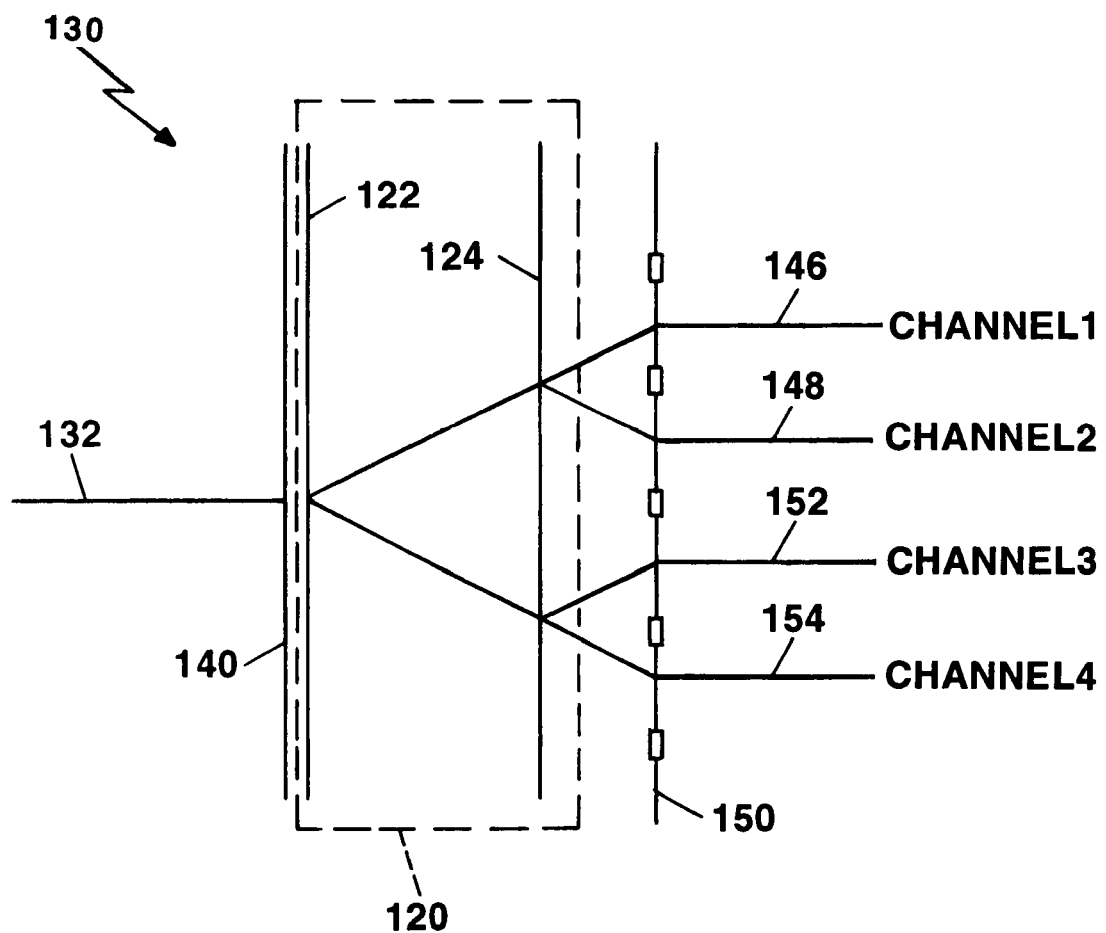
FIG. 5 is a graphical schematic representation of another embodiment of an angular dispersion compensated grating based switching/routing optical system.

In another embodiment 130 of an angular dispersion compensated system of this invention, shown in FIG. 5, the input electromagnetic radiation ("optical") beam 132 is normally (perpendicularly) incident on the input face of the optical switching and routing system 120. The embodiment 130 of the angular dispersion compensated system of this invention includes a beam steering deflection element 140 (a steering grating in the embodiment shown in FIG. 5). The steering grating 140 has half the frequency of the switched gratings 122, 124. In order to eliminate angular dispersion in the output channels 146, 148, 152, 154, it is necessary to assure that the beam 132 is subjected to an equal number of clockwise and counter clockwise diffractive deviations, i.e., that the output is diffracted parallel to the input. Referring to FIG. 5, a non-switchable pixellated grating 150 is used to provide the compensating diffraction to the channels 146, 148, 152, 154. It is desirable to use volume holographic gratings for high efficiency gratings, and for those elements the pixellation is necessary to provide for the proper slant angle for the modulation fringes (to satisfy the Bragg condition). Alternatively, blazed surface relief gratings and other types of gratings can be used.

Figure 6:
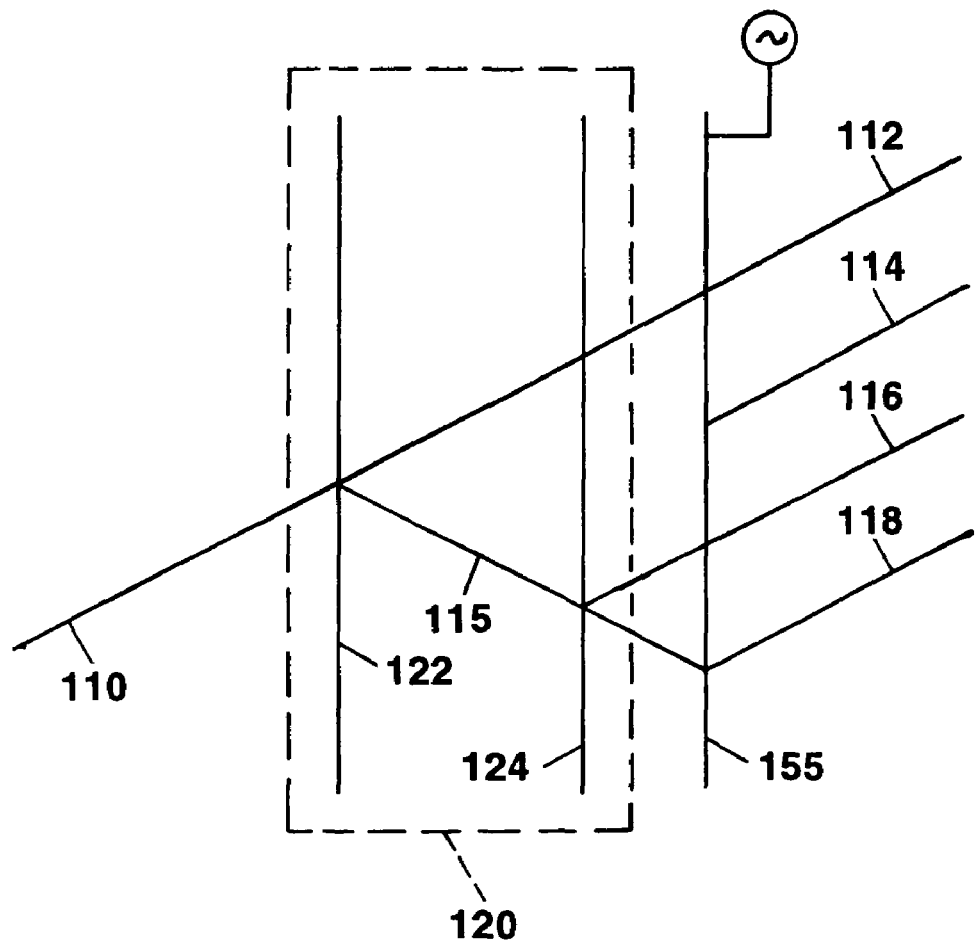
FIG. 6 is a graphical schematic representation of an embodiment of an angular dispersion compensated grating based switching/routing optical system utilizing a compensating switched steering grating.

The pixellated non-switchable grating 126 shown in FIG. 4 can be replaced by a single non-pixellated switched grating 155, as shown in FIG. 6, for the case of a single desired output location at a time. Referring to FIG. 6, in one embodiment, the entire switchable steering grating is switched "off" (non-diffracting) for the case when the channels 112, 116 that have no diffraction or a balanced diffraction being selected; and the entire steering grating is switched to "on" when the channels 114, 118 that have an unbalanced diffraction are selected to provide compensating diffraction. An added advantage of the embodiment shown in FIG. 6 is a decrease in the crosstalk in roughly half the channels.

Figure 7:
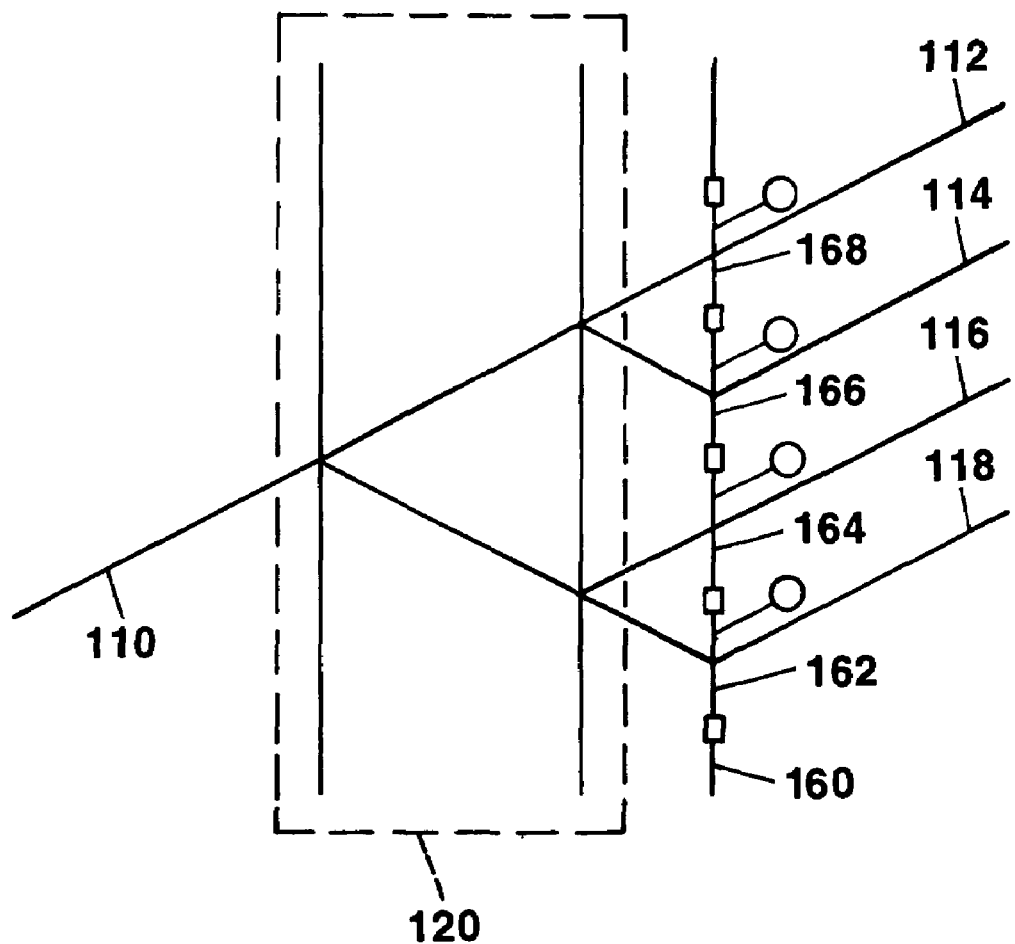
FIG. 7 is a graphical schematic representation of an embodiment of an angular dispersion compensated grating based switching/routing optical system utilizing a compensating pixellated switched steering grating.

The switched grating 155 in FIG. 6 can be replaced with a pixellated switched grating 160, as shown in FIG. 7, in which case it can also be used to decrease the crosstalk in all the non-selected channels. The grating pixels are set to steer the desired channel as shown, and to steer crosstalk signals present in the non-selected channels out of those channels and hence out of the ensuing fiber couplers (not shown). For example, if the second channel 114 is desired, pixel 166 will be set in the deflecting state. Accordingly, crosstalk will be reduced if the top 168 (first) and third 164 switched grating pixels are set diffractive to deflect the crosstalk present in those exit beams out of the output channels; and, the bottom 162 (fourth) pixel would be set non-diffractive, in order to deflect crosstalk present in the bottom channel 162 away from the fiber coupler (not shown) for that channel. The switching of selected grating pixels enables the selective deflection of crosstalk signals out of the system, reducing the detected crosstalk.

Figure 8:
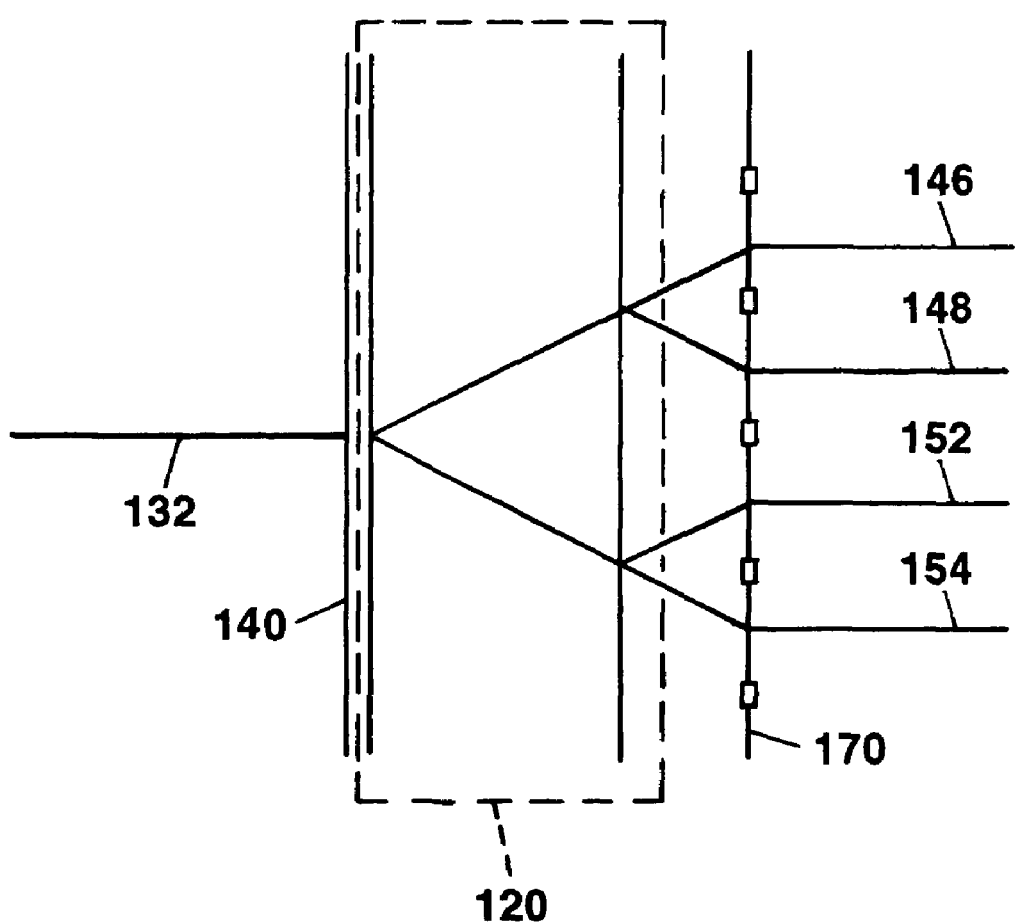
FIG. 8 is a graphical schematic representation of another embodiment of an angular dispersion compensated grating based switching/routing optical system utilizing a compensating pixellated switched steering grating.

Similarly, the switched grating 150 in FIG. 5 can be replaced with a pixellated switchable grating 170, as shown in FIG. 8, in which case it can also be used to decrease the crosstalk in all the non-selected channels. The grating pixels are set to steer the desired channel as shown, and to steer all the non-selected channels away from the path shown and hence out of the output channels. Referring to FIG. 8, the pixels in the pixellated switchable grating 170 that correspond to selected channels diffract the beam 132 while the pixels in the pixellated switchable grating 170 that correspond to the non-selected channels are set to (i.e. switched "off") not diffract the beam 132.

One embodiment of the switchable diffraction grating utilized in this invention is the switchable volume diffraction element (grating) described in U.S. Pat. No. 5,771,320, herein incorporated by reference. The embodiments of the optical switching and routing systems described in U.S. Pat. No. 5,771,320 utilize volume phase diffraction (holographic) gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. In the electrical switching embodiment, a voltage across the switched grating component switches the grating among diffracting and transparent states. Switching controls (such as logic and a voltage source) effect the transition between diffracting and transparent states (for example, controls C1, C2, C3 and C4 in FIG. 2). It should be noted that although switching controls are not shown, or separately labeled, in FIGS. 3 through 8, switching controls are present and needed in all switchable or switchable pixellated gratings.

It should be noted that if the order of grating plane spacings increases rather than decreases (the latter is shown in the FIGS. 4, 5, 6, 7, 8), the same principles hold but the pitch of the pixellation is altered, i.e., typically fewer and larger semi-field pixels are used in place of rapidly alternating small channel-to-channel pixels.

It should also be noted that, although the above described embodiments refer to two dimensional switching/routing systems, three dimensional systems, such as crossconnect switch configurations, are also within the scope of this invention.

Although the invention has been described with respect to various embodiments, it should be realized this invention is also capable of a wide variety of further and other embodiments within the spirit and scope of the appended claims.

What is claimed is:

1. A method for introducing selectable amounts of temporal dispersion into a signal, the method comprising the steps of:
   a) selectively directing an electromagnetic radiation beam to a predetermined optical path; and
   b) subsequently selectively directing the electromagnetic radiation beam to another predetermined optical path, constituting a subsequence selectively directed electromagnetic radiation beam;
   c) generating an angular separation of spectral components of the electromagnetic radiation beam, by the steps a) and b) in order to introduce the selectable amounts of temporal dispersion.

2. The method of claim 1 further comprising the step of:
   d) repeating step b) until a direction of propagation of the electromagnetic radiation beam is substantially parallel to an input direction.

3. The method of claim 1 further comprising the step of:
   d) redirecting the selectively directed electromagnetic radiation beam to a predetermined direction.

4. A method for compensating angular dispersion comprising the step of:
   selectively diffracting an output electromagnetic radiation beam originating from a switching/routing optical system;
   rendering, after selective diffraction, a direction of propagation of the electromagnetic radiation output beam parallel to an input direction in order to compensate angular dispersion.

5. The method of claim 4 further comprising the step of:
   propagating an input electromagnetic radiation beam through a steering diffracting element before entering the switching/routing optical system.

6. The method of claim 4 further comprising the step of:
   selectively diffracting at least one crosstalk induced output electromagnetic radiation beam, said at least one crosstalk induced out electromagnetic radiation beam being present in at least one nonselected channel.

* * * * *

UNITED STATES PATENT AND TRADEMARK OFFICE
CERTIFICATE OF CORRECTION

PATENT NO. : 7,230,228 B2  Page 1 of 1
APPLICATION NO. : 10/717414
DATED : June 12, 2007
INVENTOR(S) : Thomas Stone It is certified that error appears in the above-identified patent and that said Letters Patent is hereby corrected as shown below:

Col. 7, line 9
In Claim 1, delete "subsequence" and
insert -- subsequently --, therefor.

Col. 8, line 18
In Claim 6, delete "out" and
insert -- output --, therefor.

Signed and Sealed this

Twelfth Day of August, 2008

JON W. DUDAS
*Director of the United States Patent and Trademark Office*